Aug. 11, 1970            E. L. MANGAN            3,524,063

MULTIRANGE RADIATION THICKNESS GAUGE

Filed Oct. 12, 1967            2 Sheets-Sheet 1

LEGEND

| STANDARD NO. | THICKNESS INCHES |
|---|---|
| 13 | 0.400 |
| 14 | 0.200 |
| 15 | 0.100 |
| 16 | 0.080 |
| 17 | 0.040 |
| 18 | 0.020 |
| 19 | 0.010 |
| 20 | 0.008 |
| 21 | 0.004 |
| 22 | 0.002 |
| 23 | 0.001 |

INVENTOR
Edmund L. Mangan

Aug. 11, 1970     E. L. MANGAN     3,524,063
MULTIRANGE RADIATION THICKNESS GAUGE
Filed Oct. 12, 1967     2 Sheets-Sheet 2

INVENTOR
Edmund L. Mangan

United States Patent Office 3,524,063
Patented Aug. 11, 1970

3,524,063
MULTIRANGE RADIATION THICKNESS GAUGE
Edmund L. Mangan, Bethlehem, Pa., assignor to Bethlehem Steel Corporation, a corporation of Delaware
Filed Oct. 12, 1967, Ser. No. 674,905
Int. Cl. G01t 1/16
U.S. Cl. 250—83.3      13 Claims

ABSTRACT OF THE DISCLOSURE

A highly accurate and responsive five-range thickness gauge directly compares material under test to digital thickness standards introduced between a constant source of radiation and a radiation detector opposite the test material. The detector operates at one of five different constant levels of sensitivity. The standards are actuated by signals from a thickness selector and programmed by an operating mode controller to complement material thickness to equal a different precalibrated thickness constant for each operating range. This produces a five-level nonlinear output voltage at the detector which is fed to a simplified multirange translator that converts it to five-level linear output voltage. This multilevel voltage is applied against a corresponding multilevel constant electrical reference in a comparison circuit which indicates percent deviation from range full scale and signals a second translator which indicates an algebraic difference as a constant decimal deviation from thickness selection. A compensator operating in a second comparison circuit with the second translator provides against output signal variations due to variations in material temperature and composition. Automatic standardization is provided in a feedback loop from the second translator to a variable gain amplifier in the first translator.

BACKGROUND OF THE INVENTION

This invention relates generally to radiation thickness gauges. More particularly it relates to multirange radiation thickness gauges useful in measuring a wide range of metal strip thicknesses in a rolling mill, but is not limited to such applications.

Thickness measuring gauges utilizing a penetrative source of radiation such as X-rays and an electronic detector on opposite sides of material under test are well known in the art. Such gauges operate responsive to a mass absorption phenomenon which the penetrating radiation experiences during passage through the test material. The amount of absorption which occurs per unit area varies exponentially with material thickness and as a complex function of material composition, as a complex function of radiation wavelength and intensity and as a linear function of material temperature. Absorption also varies randomly because of the statistical manner in which X-radiation, for example, emanates from its source, hence requiring a sampling time to average such variations.

Heretofore, radiation thickness gauges operating on the foregoing mass absorption phenomenon generally embodied combinations of either: (1) direct comparison at each thickness using a split X-ray beam separately directed into a measuring and a reference detector and a variable source of radiation; (2) direct comparison to a standard thickness using a constant source of radiation and a split X-ray beam separately directed into a measuring and a reference detector; or (3) direct comparison of each thickness to a continuously variable electrical standard corresponding to an absorption curve while using a source of radiation variable in a prescribed manner.

None of the foregoing gauges proved entirely satisfactory to meet the requirements of high speed computerized rolling mills, especially in the steel industry. Contemporary mill installations include automatic gauging systems which continuously require rapid, highly accurate and reliable electrical signals representing compensated linear indications of linear changes in strip thickness. Such signals must be compatible with a wide range of changeable operating conditions relative to strip thickness, grade or composition, temperature and production rates.

Deficiencies in the prior art gauges in meeting the foregoing requirements are numerous. For example, most gauges lacked accuracy over a wide range of thicknesses. In those using a constant source of radiation, the thickness range had to be restricted because of the nonlinear mass absorption characteristics. Or, if a wide thickness range was available, a variable source of radiation was used at the expense of complex linearizing and/or material compensating systems. In addition, other gauges with wide thickness ranges could not provide a constant decimal deviation output signal for use with computer controlled rolling mills. Some gauges employed highly sensitive detectors, hence were noisy and erroneous. In addition, these gauges provide only a single deviation time constant which is unsuitable for use in the aforesaid rolling mills. Other gauges used detectors which were slow in responding to abrupt radiation changes such as are encountered when a strip enters or leaves the path of radiation, thus causing a long settling time. Still others had an output signal which was unsuitable for simple compensation against variations in both temperature and composition of the test material. And others lacked a relatively simple standardization feature which would enable a rapid check on and automatic adjustment of gauge calibration between successive ends of rapidly moving strips. Still others required frequent calibration and maintenance.

SUMMARY OF THE INVENTION

It is therefore an object of this invention to provide an improved radiation thickness gauge which overcomes the foregoing deficiencies, yet will continuously and rapidly supply highly accurate and reliable thickness signals to utilization circuits over protracted usage in mill environments.

In the present invention, the foregoing object is carried out by multirange apparatus combining a constant source of radiation for the total thickness range; a high-gain detector operating at a constant low sensitivity level, said level being changed for each range; preselectable digital thickness standards for both calibrating the maximum thickness absorption for each range and for directly comparing the test material thickness with complementing standards, the latter operating differentially to equal a constant calibrated thickness for each range; a simplified multirange translator; a multirange constant electrical reference source; and a comparison circuit for signaling the algebraic difference between the translator and electrical reference outputs. Because test material variations occurring anywherein a given range are complemented to maintain a constant amount of absorption for that range, this apparatus combination has the distinct advantages of virtually eliminating the accountability of the radiation source and thickness factors from the absorption phenomenon, while also allowing the detector to operate at its lowest practical gain, hence its lowest noise level. Furthermore, it has permitted the simplification of translator, standardizing and linearizing systems and enabled preselectable short duration sampling periods for averaging random radiation propagation. Moreover, it provides for accurate multirange gauge operation. Beyond that, the constant source of radiation has enabled the use of a simplified compensating network for offsetting output variations due to changes in material temperature and composition.

Other objects and advantages of the invention will become apparent from the following description of different embodiments and from the accompanying drawings.

DESCRIPTION OF THE PREFERRED EMBODIMENTS

Figure 1:
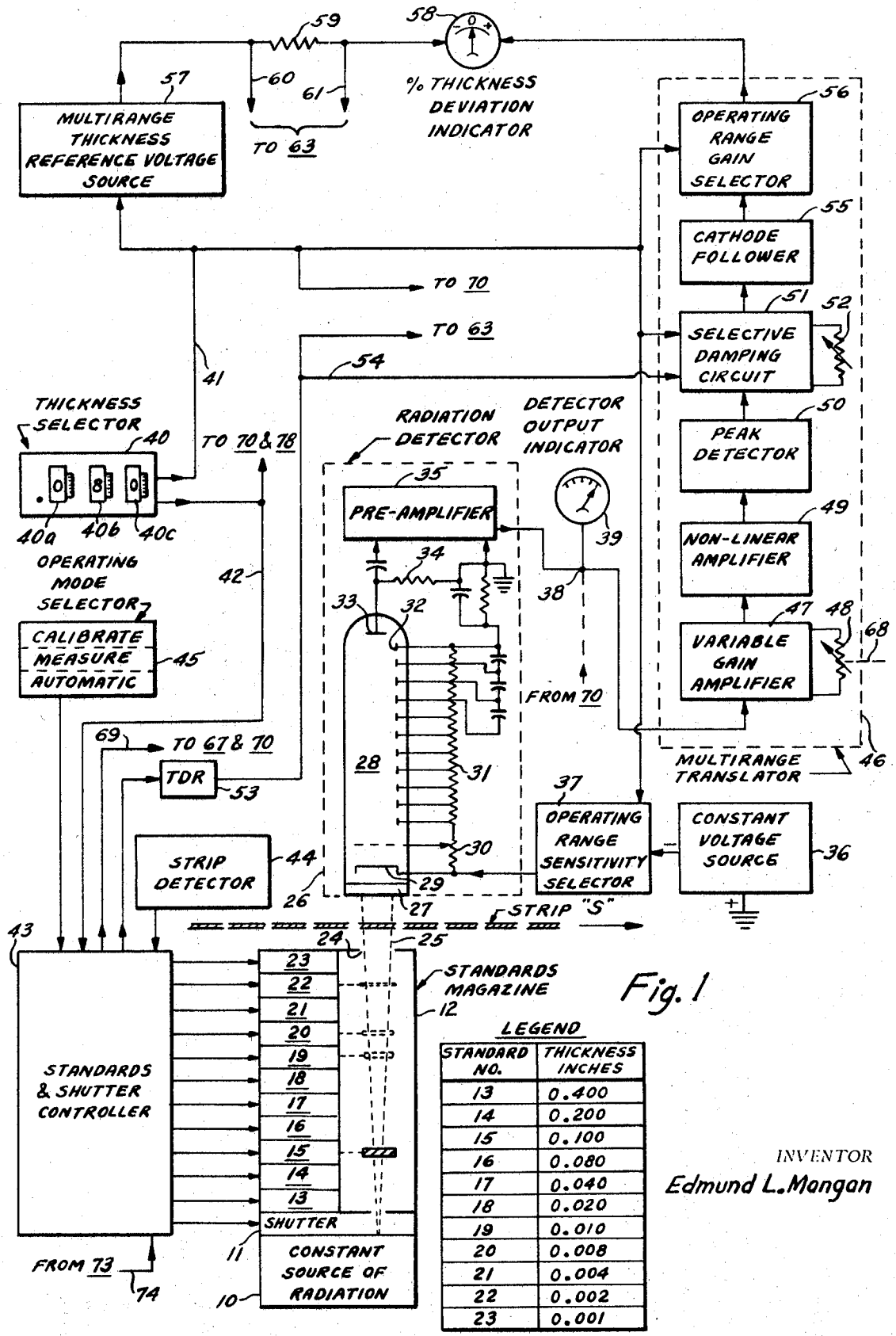
FIG. 1 is a block diagram of a multirange radiation gauge embodiment of the invention.
Figure 2:
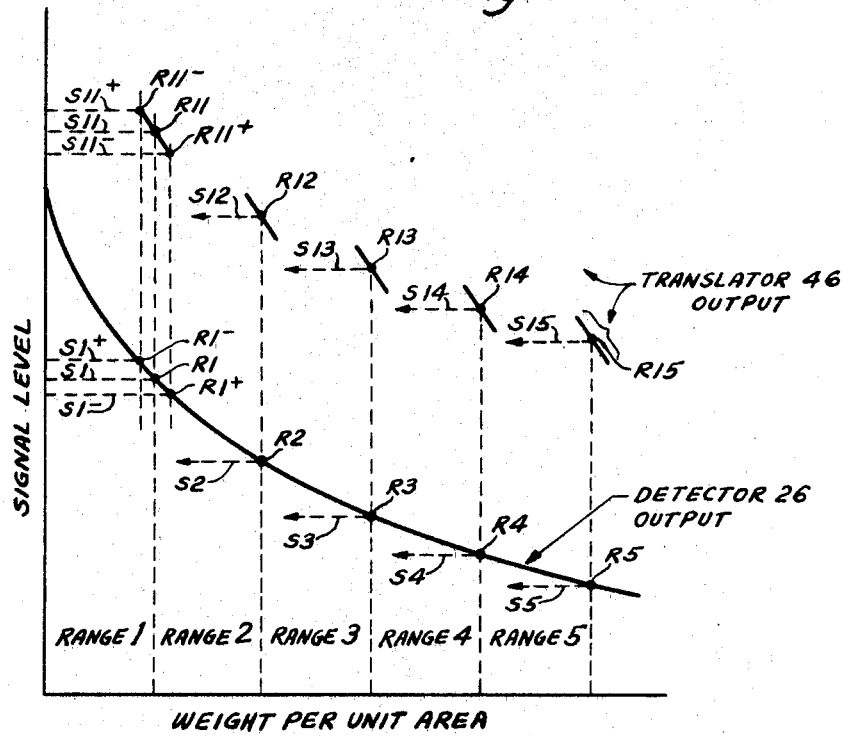
FIG. 2 is a graph of the detector output and the translator output in relation to variations in material weight per unit area in each of the ranges of gauge operation.

Referring now to FIGS. 1 and 2, a preferred embodiment of the invention will be described in relation to a five-range radiation gauge for measuring thickness and thickness deviations of steel in 0.001 inch increments in thickness ranges of: (1) up to 0.099"; (2) 0.0100" to 0.199"; (3) 0.200" to 0.299"; (4) 0.300" to 0.399" and (5) 0.400" to 0.499". It will be understood that the invention is in no way limited to this example as other thickness increments and ranges may be used as well as other types of materials.

In one aspect of the preferred embodiment, the thickness gauge comprises a constant source of radiation 10, such as produced by a stable X-ray generator operated in a controlled environment at a constant average level of 92.6 kv. and a wavelength of about 0.175 angstrom, or alternatively a radioactive source of similar wavelength and penetrative characteristics. Radiation from source 10 is passed under control of powered lead shutter 11 into one end of a standards magazine 12, through a preselected number of powered digital thickness standards 13 through 23, then through aperture 24 as a beam 25 directed at one side of a steel strip S under test.

Shutter 11 and thickness standards 13 through 23 are introduced into the path of radiation by solenoid actuators (not shown) powered in a manner as will be explained below. Thickness standards 13 through 23 each consist of the same known steel composition but of a different eleven-bit binary coded decimal thickness value according to the legend appearing in FIG. 1. With this combination of eleven standards any three decimal digit thickness up to 0.500" may be introduced into the path of radiation in 0.001" increments. Each digit is selected according to a binary coding system. However, the most significant digit involving standards 13 to 15 is used to select calibrating standards and the two least significant digits involving standards 16 to 23 are used to select complementing standards as will be explained more fully hereinafter.

A radiation detector 26 is positioned in a controlled environment on the opposite side of strip S to receive penetrated radiation at a cesium iodide scintillation crystal 27 in a decreasing amount as thickness increases, i.e., the greatest penetrated radiation intensity in when material absorption (thickness) is least. Crystal 27 is optically coupled to photomultiplier tube 28, for example an RCA type 6342A, where light strikes its photocathode 29. Photocathode 29 is connected through a grid focusing potentiometer 30 in a conventional buffered voltage divider network 31 which is circuited to the tube's dynodes 32, then connected to ground. The tube's anode 33 is shunted to ground through load resistor 34 and coupled capacitively to preamplifier 35.

In the present invention, the gauge is operated with its least sensitivity in the lowest thickness range and the greatest sensitivity in its highest range so as to attain detector output as shown in the detector output curve in FIG. 2. To achieve this, photomultiplier tube 28 is circuited to operate at five different constant levels of sensitivity in its low gain region where its output is substantially linear and least noisy. This has numerous advantages over other gauges which utilize its fullest gain potential of about 10,000 at the expense of noisy, nonlinear, output voltages.

Inasmuch as photomultiplier tube 28 gain is a function of its applied voltage (volts per stage across voltage divider 31), a photocathode 29 is fed with a high negative voltage from a 1000 volt DC constant voltage source 36 through operating range selector 37. Selector 37 has an adjustable current limiting resistor for each operating range and it selectively connects photocathode 29 to source 36 under control of five range selection signals later described. The resistors are adjusted to apply from about −350 volts in range one to about −600 volts in range five to photocathode 29. This produces a substantially linear current gain of about 100 in range one and about 1000 in range five. This also produces a multilevel voltage across load resistor 34 for the five ranges of operation. This voltage is fed through preamplifier 35 to junction point 38 and then to detector output meter 39 which has a different scale calibration reference point reading from left to right for each range of gauge operation.

In one form of the invention, the multirange thickness gauge may be operated to determine an unknown thickness of strip S, yet in another form it may be operated to determine thickness deviations from a desired thickness. In both cases, thickness selections are made by thickness selector 40 which consists of three decade thumbwheel switches and associated circuitry for producing two types of coded signals.

The first type is five separate signals at circuit 41 for selecting each range of gauge operation which are derived when the most significant digit thumbwheel 40a is set at 0, 1, 2, 3 and 4 corresponding to operating ranges 1, 2, 3, 4 and 5. These signals are fed to operating range sensitive selector 37 and other components yet to be described.

The second type of coded signal is an eleven-bit binary coded decimal signal at circuit 42 for selecting thickness standards associated with the three decimal digits represented by the settings of thumbwheels 40a, 40b and 40c.

Standards and shutter controller 43 includes a power supply and logic devices, such relays, circuited to power shutter 11 and to respond to the coded thickness signals so that the most significant digit 40a setting will power thickness standards 13, 14 and 15 additively, which hereinafter will be referred to as calibrating standards, for the purpose of establishing a thickness absorption constant for each range of gauge operation. The logic circuitry is further arranged so that the least significant digits 40b and 40c settings will power thickness standards 16 to 23 differentially, which hereinafter will be referred to as measuring standards, for the purpose of complementing the strip S thickness to equal the thickness absorption constant for any given range since they only cover 0.100".

The actual combinations of thickness standards powered relative to thumbwheel 40a, 40b and 40c settings appear in Table I below:

the radiation during the presence of strip S in the gauge. For example, again assume that a desired thickness of strip S was 0.080" and this value was preset on thickness

TABLE I

0—Designates circuit or thickness standard de-energized
1—Designates circuit or thickness standard energized Calibrating standards

| Thumbwheel 40a decimal indication (inch) | Binary coded decimal bit | | | Thickness, Standard No. | | |
|---|---|---|---|---|---|---|
| | 1 | 2 | 4 | 15, .1" | 14, .2" | 13, .4" |
| .0—Range 1 | 0 | 0 | 0 | 1 | 0 | 0 |
| .1—Range 2 | 1 | 0 | 0 | 0 | 1 | 0 |
| .2—Range 3 | 0 | 1 | 0 | 1 | 1 | 0 |
| .3—Range 4 | 1 | 1 | 0 | 0 | 0 | 1 |
| .4—Range 5 | 0 | 0 | 1 | 1 | 0 | 1 |

Measuring standards

| Thumbwhell 40b decimal indication (inch) | Binary coded decimal bit | | | | Thickness, Standard No. | | | |
|---|---|---|---|---|---|---|---|---|
| | 1 | 2 | 4 | 8 | 19, .01" | 18, .02" | 17, .04" | 16, .08" |
| .00 | 0 | 0 | 0 | 0 | 0 | 0 | 1 | 1 |
| .01 | 1 | 0 | 0 | 0 | 0 | 0 | 0 | 1 |
| .02 | 0 | 1 | 0 | 0 | 1 | 1 | 1 | 0 |
| .03 | 1 | 1 | 0 | 0 | 0 | 1 | 1 | 0 |
| .04 | 0 | 0 | 1 | 0 | 1 | 0 | 1 | 0 |
| .05 | 1 | 0 | 1 | 0 | 0 | 0 | 1 | 0 |
| .06 | 0 | 1 | 1 | 0 | 1 | 1 | 0 | 0 |
| .07 | 1 | 1 | 1 | 0 | 0 | 1 | 0 | 0 |
| .08 | 0 | 0 | 0 | 1 | 1 | 0 | 0 | 0 |
| .09 | 1 | 0 | 0 | 1 | 0 | 0 | 0 | 0 |

| Thumbwhell 40c decimal indication (inch) | Binary coded decimal bit | | | | Thickness, Standard No. | | | |
|---|---|---|---|---|---|---|---|---|
| | 1 | 2 | 4 | 8 | 23, .001" | 22, .002" | 21, .004" | 20, .008" |
| .000 | 0 | 0 | 0 | 0 | 0 | 1 | 0 | 1 |
| .001 | 1 | 0 | 0 | 0 | 1 | 0 | 0 | 1 |
| .002 | 0 | 1 | 0 | 0 | 0 | 0 | 0 | 1 |
| .003 | 1 | 1 | 0 | 0 | 1 | 1 | 1 | 0 |
| .004 | 0 | 0 | 1 | 0 | 0 | 1 | 1 | 0 |
| .005 | 1 | 0 | 1 | 0 | 1 | 0 | 1 | 0 |
| .006 | 0 | 1 | 1 | 0 | 0 | 0 | 1 | 0 |
| .007 | 1 | 1 | 1 | 0 | 1 | 1 | 0 | 0 |
| .008 | 0 | 0 | 0 | 1 | 0 | 1 | 0 | 0 |
| .009 | 1 | 0 | 0 | 1 | 1 | 0 | 0 | 0 |

Controller 43 is also responsive to strip detector 44, an infrared sensitive device for example, which signals the presence and absence of strip S in the vicinity of radiation beam 25.

Gauge operation is under control of operating mode selector 45 which includes switching and circuit means for programming controller 43 for either a manual calibrate, a manual measure or an automatic mode of operation.

In the manual calibrate mode, controller 43 applies power to open shutter 11 and to power the calibration standards 13, 14 andd/or 15 into the path of radiation during the absence of strip S from the gauge. For example, assume that a desired thickness of strip S was 0.080" and was preset on thickness selector 40, then calibration standard 15 (0.100") will automatically be introduced into the path of radiation. Operating range sensitivity selector 37 will have been preselected for range one operation, point R1 on detector output curve (FIG. 2), and detector 26 output signal at junction point 38 will correspond with level S1 (FIG. 2). This will cause the pointer on detector output indicator 39 to swing to the far right and coincide with a calibrated scale marking for range one.

Calibration of the remaining ranges of operation is carried out in the same manner, whereby the calibration standards 13, 14 and 15 are introduced either singly or in combination per Table I. Range points R2, R3, R4 and R5 on the detector output curve (FIG. 2) have corresponding detector output signal levels at S2, S3, S4 and S5, respectively. These are produced by an increase in absorption with increasing range and an increase in photomultiplier 28 sensitivity by action of sensitivity selector 37 as explained above. Detector output indicator 39 responds accordingly to conincide with respective callibrated scale markings arranged from right to left.

In the manual measure mode, controller 43 applies power to open shutter 11 and to power the measure standards 16 through 23 differentially into the path of selector 40, then measuring standards 19, 20 and 22 (totaling 0.020") will automatically be introduced into the path of the radiation to raise the total amount of absorption to 0.100", the calibrated thickness constant for range one. Consequently, detector 26 output signal will drive detector output indicator 39 to the calibrated scale value for range one.

If the actual thickness of strip S was either greater or less than 0.080", such as is indicated at points R1+ or R1− in FIG. 2, then detector 26 output signal would correspondingly change to levels S1− or S1+, respectively. It will be observed that the change in signal level is nonlinear and the amount of nonlinearity is different for each range of gauge operation, hence requiring linearizing for indicating linear deviations from the thickness value appearing on thickness selector 40 as will be described later.

Alternately, if the actual thickness of strip S differs from the setting on thickness selector 40, its correct thickness may be determined by varying the thumbwheels on thickness selector 40 until the pointer on indicator 39 is restored to the calibrated scale value for range one.

In the automatic mode of operation, controller 43 operates to apply power to maintain shutter 11 open and calibrating standards 13, 14, and/or 15 in the path of radiation until strip S enters the gauge. At this instant, strip detector 44 signals controller 43 to simultaneously withdraw the calibrating standards and insert the measuring standards to complement strip S thickness. This action, in conjunction with the operation of time delay relay 53 explained below, produces only a very slight "bump" in detector 26 output, thereby avoiding a long settling time before making a thickness measurement. As strip S leaves the gauge, the reverse movement of standards takes place so that there is always some absorption material in the path of radiation and that the gauge can be calibrated rapidly without involving shutter 11 movement.

Still referring to FIGS. 1 and 2, the various levels of detector 26 output voltages S1, S2, S3, S4 and S5 appearing at junction point 38 are fed to the input of multi-range translator 46 where they are converted to linear output signals for each range.

Translator 46 includes a two-stage variable gain amplifier 47 receiving the detector output signal from junction 38. Amplifier 47 is equipped with gain adjuster 48 to fix its output at a suitable gain level for zeroing gauge output in all of its ranges. Means for accomplishing this automatically will be described later.

The output of amplifier 47 is fed to a nonlinear amplifier 49 which utilizes an off-peak pentode, such as an RCA type 6SG7, to offset the nonlinear variations in detector output signals over the entire operating range of the gauge. Since the detector output signals appear at levels S1, S2, S3, S4 and S5, nonlinear amplifier 49 is correspondingly operated at five different regions of the nonlinear characteristics of the off-peak pentode. This has a substantial advantage over other gauges which employ complex linearizing systems for just one range of operation. Moreover, it permits the use of a simplified comparison and reference source as will be described later.

Peak detector 50 receives the output from nonlinear amplifier 49 and is adjusted to pass only those signals above a certain level which vary proportional to thickness variations caused by changes in absorption at a given wavelength of the radiation beam 25.

The peak detector output is fed to selective damping circuit 51 which increases the response time for each range of gauge operation in keeping with increase detector 26 sensitivity with each range. A resistance-capacitance network is provided which has its capacitance values selectively varied responsive the range selection signals on circuit 41 and is continuously variable within limits by response adjuster 52. Gauge response time to 63% of an abrupt thickness change of plus or minus 20% of range full scale is characterized by the following time constants: range one—.05 to .1 sec.; range two—.1 to .2 sec.; range three—.15 to .3 sec.; range four—.2 sec. to .4 sec.; and range 5—.25 to .5 sec. These time constants are momentarily reduced to near zero by action of time delay relay 53 which produces a momentary shunting of a substantial part of selective damping circuits 51 whenever strip S is detected by strip detector 44 or thickness standards are changed by controller 43. Gauge signals with these time constants are quite desirable in rolling mills where the signals are utilized in automatic gauge control systems.

The output from selective damping circuit 51 is fed by way of cathode follower 55 through operating range gain selector 56 which, under control of the range selection signals from circuit 41, set translator 46 output voltage levels. At range points R11 through R15 on the translator output curve in FIG. 2, these voltage levels correspond to S11 through S15, respectively. Any linear variation in strip S thickness from a value preset on selector 40, such as occurs at points R11+ and R11−, will now produce a corresponding linear change in translator 46 output voltage at points S11− and S11+, respectively. This change is of the same magnitude in each range and is therefore expressed in terms of percent of range full scale.

Translator 46 multilevel output voltage operates against a multirange thickness reference voltage source 57. Source 57 is operative under control of range selecting signals at circuit 41 for producing a constant reference voltage for each range of gauge operation. These are equal to the translator 46 output voltage occurring at S11 through S15 levels, respectively. Both the translator and thickness reference voltage are simultaneously compared in a circuit where their algebraic difference is indicated on percent thickness deviation indicator 58. Any difference that may be indicated is with respect to the thickness value of range full scale. Their algebraic difference is also reflected in the voltage drop across load resistor 59, this being fed over conductors 60 and 61 to other circuits in FIG. 3.

Figure 3:
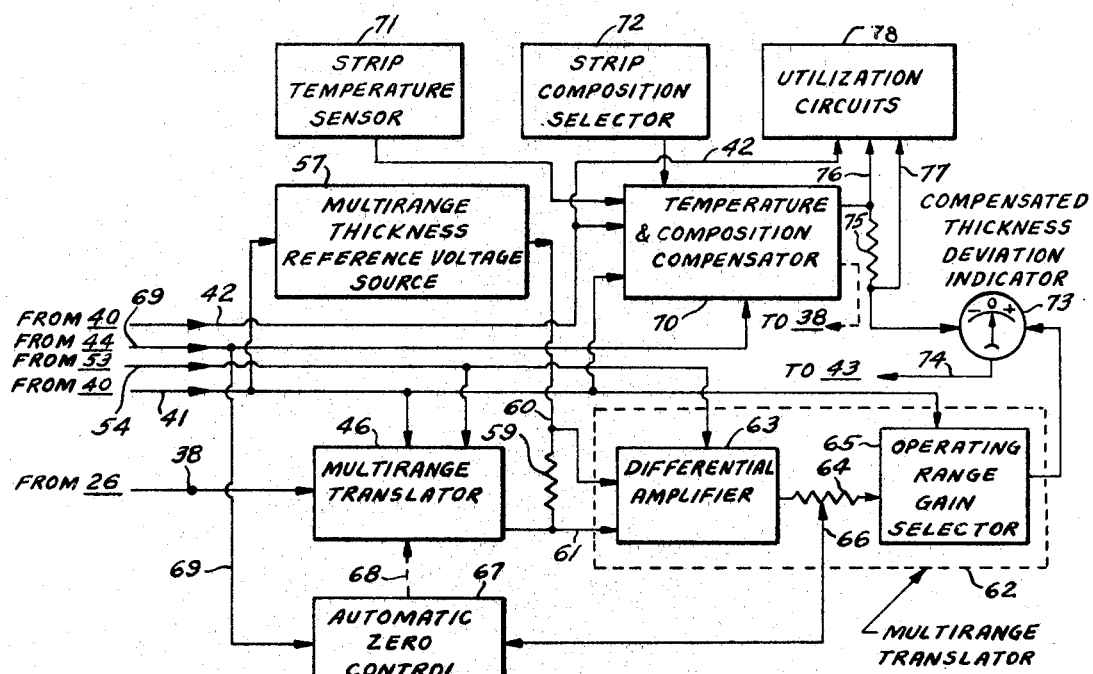
FIG. 3 is a block diagram extending the FIG. 1 embodiment to include compensating and standardizing embodiments of the invention.

FIG. 3 shows an extension of the embodiment shown in FIG. 1 to include compensating and standardizing embodiments of the invention. A second multirange translator 62 is provided for isolating and converting the linear percent thickness deviation signals appearing across load resistor 59 to a decimal thickness deviation signal which varies linearly by the same amount for each range of gauge operation for standardizing and compensating purposes.

Translator 62 consists of differential amplifier 63 having its input connected across load resistor 59 by conductors 60, 61, which are momentarily shorted by action of circuit 54 previously described, a standardizing feedback potentiometer 64 circuited between the output of amplifier 63, and operating range gain selector 65. Gain selector 65 includes an adjustable potentiometer for each range of gauge operation which, under control of range selection signals at circuit 41, adjusts translator 62 output in correspondence with the changes in selection of range full scale produced at translator 46 output. This maintains the same amount of decimal output signal variation for each range of gauge operation.

Feedback potentiometer slider 66 supplies a portion of translator 62 output signal to automatic zero control 67. This device consists, for example, of a servo amplifier feeding a fast response servo motor which is connected through linkage 68 to vary gain adjuster 48 in translator 46 (FIG. 2). Automatic zero control 67 is operative under control of circuit 69 from strip detector 44 only when no strip S is in the gauge, but when a calibration standard 13, 14 and/or 15 is in the path of radiation. During this time the servo motor is free to drive gain adjuster 48 until the output at translator 62 reaches zero, thus enabling the offsetting of a number of potential variables to maintain a high degree of gauge accuracy. When operating mode selector 45 (FIG. 2) is in automatic mode, the gauge is standardized automatically each time strip S leaves the gauge.

As mentioned previously, the amount of absorption experienced by radiation passing through a material varies as a complex function of material composition and as a linear function of material temperature. In applications where the test material is not subjected to these variations no compensation for their effects on gauge accuracy is required. However, in metal rolling mills, especially hot strip mills, the strip rolling temperature may vary between 1100° and 1900° F. In addition the grade, or composition, may vary considerably from strip to strip, depending upon production schedules. For these reasons it is desirable to incorporate compensating devices into the gauge to maintain its high accuracy capability.

The present invention has embodied such a temperature and composition compensator which is described in my copending application entitled "Temperature and Composition Compensator for Radiation Thickness Gauges," filed on or about Oct. 10, 1967. Briefly, it consists of temperature and composition compensator 70 which is signaled by a temperature sensor 71, such as a Land pyrometer, located adjacent radiation detector 26, and by a strip composition selector 72. The temperature signal is converted by means within compensator 70 to a percent thickness correction vs. temperature signal.

The amount of composition compensation required is based on material thickness and radiation wavelength. Published data to this effect is available in tabular form for various steel compositions relative to the composition of thickness standards 13 through 23 and valid at a known constant wavelength. Inasmuch as source 10 fulfills the radiation requirements, this data may be expressed in terms of plus or minus percent composition and is therefore entered in compensator 70 in this fashion by selector 72.

Both the percent temperature and the percent composition signals are algebraically summed in compensator 70, then appropriately scaled responsive to thickness range signals 41, to account for changes in detector 26 sensitivity with each range, and thickness selection signals 42, to account for the entire range of material thicknesses. This produces a percent total compensation signal compatible with translator 62 output signal. For convenience during standardization, compensator 70 output is momentarily grounded by action of circuit 69 when automatic zero control 67 is in operation.

The translator 62 and compensator 70 output signals are simultaneously compared in a circuit where their algebraic difference is indicated on compensated thickness deviation indicator 73, relative the thickness selection on selector 40. Indicator 73 is a zero-center meter relay having adjustable high and low limit contacts. These operate as an off-scale signal over circuit 74 on controller 43 to close shutter 11 after a momentary delay when reaching either a high or low deviation condition.

The algebraic difference between translator 62 and compensator 70 output signals is also reflected in the voltage drop across load resistor 75. This is fed by conductors 76, 77 as a compensated decimal thickness deviation signal, together with thickness selecting signals 42, to utilization circuits 78. Such utilization circuits may be recorders, other indicators, computers or automatic gauge control systems.

In an alternate arrangement, compensator 70 output with slight modification for thickness scaling may be summed with radiation detector 26 output signal as shown by the dotted line connected to junction point 38. In this manner any variations in penetrated radiation due to variations in material temperature or composition may be compensated for so that when thumbwheels 40a, 40b and 40c are suitably rotated accurate indications at the various calibrated scale points on indicator 39 are provided.

I claim:
1. A multirange radiation gauge for determining the thickness of a test material, comprising:
   (a) means for producing a constant source of penetrative radiation beamed at one side of the test material;
   (b) thickness selecting means for producing various thickness selecting signals and thickness range signals identifiable with a different thickness constant for each range of gauge operation;
   (c) radiation absorbing means including means responsive to the thickness selecting signals for introducing one or more thickness standards differentially into the radiation beam relative a precalibrated thickness constant for a given range of gauge operation; and
   (d) multirange detecting means, having plural constant sensitivity levels selected by means operative under control of the range signals, for producing a multilevel, nonlinear, output signal proportional to the intensity of penetrated radiation opposite the test material.

2. The apparatus of claim 1 further including means for indicating the detecting means output signal level relative a different calibrated value for each range of gauge operation.

3. The apparatus of claim 1 wherein the radiation absorbing means comprises:
   (a) a powered shutter;
   (b) a standard magazine having a plurality of powered digital thickness standards for introducing one or more of said standards into the path of the beamed radiation;
   (c) a controller, including a power supply and logic devices circuited to respond to the thickness selecting signals, for powering the shutter and for powering a single thickness standard or a digitally coded combination of standards;
   (d) material detecting means for acting on the controller when the material enters or leaves the gauge;
   (e) an operating mode selector including switching means for programming the controller for either a manual calibrate, a manual measure or an automatic mode of operation;
      said controller when operating in the manual calibrate mode applying power to open the shutter and to activate thickness standards equal to a thickness constant corresponding to a given operating range as determined by the thickness selecting signals, both during the absence of material from the gauge,
      said controller when operating in the manual measure mode applying power to open the shutter and to activate thickness standards differentially relative the actual thickness setting so as to maintain the thickness constant at a precalibrated value, both when material enters the gauge, and
      said controller when operating in the automatic mode applying power to maintain the shutter in an open position, to activate the thickness standards as in the manual calibrate mode, and to automatically switch activation of the standards from the calibrate to the measure mode when the test material enters the gauge.

4. The apparatus of claim 1 wherein the multirange detecting means includes:
   (a) a photomultiplier tube aimed at the penetrated radiation, said tube having a photocathode, and a plurality of dynodes, all connected in circuit across a voltage divider network to effect operation at a low gain region of the tube's capabilities;
   (b) a constant negative voltage source; and
   (c) a sensitivity selector operative under control of the range signals for applying a different constant negative voltage from said source to the photocathode for each range of gauge operation.

5. The apparatus of claim 1 further including:
   (e) compensating means responsive to material temperature signals and material composition signals, and operative under control of the thickness selecting and range signals, for producing a compensating output signal which varies due to variations of said factors as they affect penetrated radiation, and
   (f) circuit means for algebraically summing the compensating output signal with the detecting means output signal.

6. The apparatus of claim 1 wherein the detecting means sensitivity level varies inversely with thickness range.

7. A multirange radiation gauge for determining the thickness of a test material, comprising:
   (a) means for producing a constant source of penetrative radiation beamed at one side of the test material;
   (b) thickness selecting means for producing various thickness selecting signals and thickness range signals identifiable with a different thickness constant for each range of gauge operation;
   (c) radiation absorbing means including means responsive to the thickness selecting signals for introducing one or more thickness standards differentially into the radiation beam relative a precalibrated thickness constant for a given range of gauge operation;
   (d) multirange detecting means, having plural constant sensitivity levels selected by means operative under control of the range signals, for producing a multilevel, nonlinear, output signal proportional to the intensity of penetrated radiation opposite the test material;
   (e) multirange translating means operative under control of the range signals for converting the detecting means multilevel, nonlinear, output signal to a linear percentage thickness deviation output signal having a different nominal value for each operating range;

(f) multirange reference source means operative under control of the range signals for producing a constant reference voltage equal to the translating means nominal output voltage for each range of gauge operation; and (g) a comparison circuit for comparing the translating means output signal against the reference voltage and for producing a percent deviation output signal of their algebraic difference.

8. The apparatus of claim 7 wherein the translating means includes a variable gain amplifier with a gain adjuster for standardizing the percent deviation output signal.

9. The apparatus of claim 7 wherein the translating means includes a nonlinear amplifier having operating characteristics which oppose the nonlinearities of the detecting means output signal, thereby to produce said linear output signal while operating in a different characteristic region for each range of gauge operation.

10. The apparatus of claim 7 wherein the translating means includes selective damping means operative under control of the range signals for effecting a different response time for each range of gauge operation.

11. The apparatus of claim 10 further including material detecting means operatively associated with the selective damping means for momentarily reducing said response time to near zero when the test material first enters the gauge.

12. The apparatus of claim 7 wherein the translating means includes a variable gain amplifier with a gain adjuster, said apparatus further including:

(h) a second translating means for converting the percent deviation output signal to a decimal thickness deviation output signal and including a feedback circuit preceding its output;

(i) standardizing means operative on the gain adjuster in response to the feedback circuit for standardizing percent deviation output signal; and (j) means for rendering the standardizing means effective during the absence of material from the gauge.

13. The apparatus of claim 7 further including:

(h) a second translating means for converting the percent deviation output signal to a decimal thickness deviation output signal;

(i) compensating means responsive to material temperature signals and material composition signals, and operations under control of the thickness selecting and range signals, for producing a compensating output signal which varies due to variations of said factors as they affect pentrated radiation; and (j) a second comparison circuit for comparing the actual thickness deviation signal against the compensating output signal and for producing a compensated thickness deviation output signal which is utilizable in other circuits.

References Cited

UNITED STATES PATENTS

| | | | |
|---|---|---|---|
| 2,598,825 | 6/1952 | Orellana | 250—83.3 |
| 3,183,354 | 5/1965 | Amrehn | 250—83 X |

RALPH G. NILSON, Primary Examiner

D. L. WILLIS, Assistant Examiner

U.S. Cl. X.R.

250—71.5

UNITED STATES PATENT OFFICE
CERTIFICATE OF CORRECTION

Patent No. 3,524,063          Dated   August 11, 1970

Inventor(s)    Edmund L. Mangan

It is certified that error appears in the above-identified patent and that said Letters Patent are hereby corrected as shown below:

Column 3, line 3, "anywherein" should read -- anywhere in --; line 40, "0.0100" should read -- 0.100 --. Column 4, line 3, "in" should read -- is --; line 56, "sensitive" should read -- sensitivity --. Column 5, line 15, "thumbwhell" should read -- thumbwheel --; line 47, "andd/or" should read -- and/or --; line 30, "thumbwhell" should read -- thumbwheel --.

Signed and sealed this 3rd day of November 1970.

(SEAL)
Attest:

EDWARD M. FLETCHER, JR.            WILLIAM E. SCHUYLER, JR.
Attesting Officer                  Commissioner of Patents

UNITED STATES PATENT OFFICE
CERTIFICATE OF CORRECTION

Patent No. 3,524,063          Dated August 11, 1970

Inventor(s) Edmund L. Mangan

It is certified that error appears in the above-identified patent and that said Letters Patent are hereby corrected as shown below:

Column 8, line 58, after "Oct. 10, 1967" add
- - now Patent No. 3,482,098 - - .

Signed and sealed this 28th day of September 1971.

(SEAL)
Attest:

EDWARD M.FLETCHER,JR.          ROBERT GOTTSCHALK
Attesting Officer              Acting Commissioner of Patents